(12) United States Patent
Yokoi et al.

(10) Patent No.: US 10,903,726 B2
(45) Date of Patent: Jan. 26, 2021

(54) STATOR AND ROTARY ELECTRIC MACHINE

(71) Applicant: HONDA MOTOR CO., LTD., Tokyo (JP)

(72) Inventors: Masashi Yokoi, Tokyo (JP); Takuya Fujimori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 16/416,300

(22) Filed: May 20, 2019

(65) Prior Publication Data

US 2019/0363615 A1 Nov. 28, 2019

(30) Foreign Application Priority Data

May 22, 2018 (JP) ................................ 2018-098237

(51) Int. Cl.
*H02K 11/25* (2016.01)
*H02K 1/16* (2006.01)
(Continued)

(52) U.S. Cl.
CPC ............... *H02K 11/25* (2016.01); *H02K 1/16* (2013.01); *H02K 1/185* (2013.01); *H02K 3/16* (2013.01);
(Continued)

(58) Field of Classification Search
CPC .......... H02K 11/25; H02K 1/16; H02K 1/185; H02K 3/345; H02K 3/16; H02K 3/12;
(Continued)

(56) References Cited

U.S. PATENT DOCUMENTS 6,153,954 A * 11/2000 Uchida ................... H02K 11/25
310/68 C
10,468,949 B2 * 11/2019 Yamagishi ............... H02K 9/19
(Continued)

FOREIGN PATENT DOCUMENTS

CN 102812624 12/2012
CN 103166339 6/2013
(Continued)

OTHER PUBLICATIONS

Chinese Office Action for Chinese Patent Application No. 201910417423.6 dated Oct. 14, 2020.

*Primary Examiner* — John K Kim
(74) *Attorney, Agent, or Firm* — Amin, Turocy & Watson, LLP

(57) ABSTRACT

A stator which includes a stator core having an annular shape and a plurality of electric conductors that include a coil end which is mounted on a slot of the stator core and which protrudes in an axial direction of the stator core, the stator including: a joint part that is provided on the coil end and that is covered by an insulating part after the electric conductors are joined together; a non-joint part that is a different part of the coil end than the joint part; and a thermistor that detects a heating temperature of the coil end, wherein a recess part that is recessed in the axial direction is provided on an end surface in the axial direction of the stator core, and the thermistor is arranged in the recess part in a state of being in contact with the non-joint part of the coil end in a predetermined electric conductor among the electric conductors.

6 Claims, 10 Drawing Sheets

(51) Int. Cl.
  *H02K 1/18*   (2006.01)
  *H02K 3/34*   (2006.01)
  *H02K 3/16*   (2006.01)
  *F16B 2/22*   (2006.01)
  *H01C 7/00*   (2006.01)
  *F16M 13/02*   (2006.01)

(52) U.S. Cl.
  CPC ............... *H02K 3/345* (2013.01); *F16B 2/22* (2013.01); *F16M 13/02* (2013.01); *H01C 7/008* (2013.01)

(58) Field of Classification Search
  CPC .. H02K 1/12; H02K 3/38; F16B 32/22; H01C 7/008; F16M 13/02
  USPC ........................................................ 310/68 C
  See application file for complete search history.

(56) References Cited

U.S. PATENT DOCUMENTS

| | | | | |
|---|---|---|---|---|
| 2002/0117912 | A1* | 8/2002 | Kusase | H02K 19/365 310/68 C |
| 2013/0106251 | A1* | 5/2013 | Kaneshige | G01K 13/00 310/68 B |
| 2013/0156071 | A1* | 6/2013 | Wan | H02K 3/345 374/183 |
| 2013/0270973 | A1* | 10/2013 | Ikemoto | H02K 11/25 310/68 C |
| 2013/0320817 | A1* | 12/2013 | Marschall | H02K 11/0094 310/68 C |
| 2014/0184031 | A1* | 7/2014 | Kaneshige | H02K 11/25 310/68 B |
| 2014/0254632 | A1* | 9/2014 | Kaneshige | H02K 11/25 374/208 |
| 2015/0295477 | A1* | 10/2015 | Koizumi | H02K 3/48 310/68 C |
| 2019/0363615 | A1* | 11/2019 | Yokoi | H02K 1/16 |

FOREIGN PATENT DOCUMENTS

| | | |
|---|---|---|
| CN | 105009426 | 10/2015 |
| CN | 106104987 | 11/2016 |
| JP | 5741327 | 7/2015 |

\* cited by examiner

STATOR AND ROTARY ELECTRIC MACHINE

CROSS-REFERENCE TO RELATED APPLICATION

Priority is claimed on Japanese Patent Application No. 2018-098237, filed on May 22, 2018, the contents of which are incorporated herein by reference.

BACKGROUND

Field of the Invention

The present invention relates to a stator and a rotary electric machine.

Background

In the related art, a rotary electric machine is used as a power source of a hybrid automobile and an electric automobile. The rotary electric machine includes a stator core having a slot and a plurality of electric conductors that include a coil end which is mounted on the slot and which protrudes in an axial direction of the stator core. A joint part that is covered by an insulating part after the electric conductors are joined together is provided on the coil end. The insulating part is formed, for example, by immersing the joint part in an insulating paint.

Electric power is supplied to the rotary electric machine at the time of operation, and thereby, the electric conductor generates heat. Specifically, in a case where a load of the rotary electric machine becomes excessive or the like, there may be cases in which the temperature (heating temperature) of the electric conductor is greatly increased, and the performance of the rotary electric machine is degraded. Therefore, it is necessary to monitor the heating temperature of the electric conductor and appropriately perform control or the like of the rotary electric machine.

For example, in Japanese Patent No. 5741327, a method of detecting the heating temperature of the electric conductor using a thermistor in order to monitor the heating temperature of the electric conductor is described.

In the stator of Japanese Patent No. 5741327, the thermistor is arranged in contact with an outer surface of the coil end. Thereby, the thermistor is able to detect the heating temperature of the coil end.

SUMMARY

However, in the stator of the related art, when the thermistor is arranged in the vicinity of the joint part of the coil end at the time of manufacturing, a masking may be applied to a contact region between the thermistor and the electric conductor. However, a process of applying the masking is complicated. Further, in a case where the insulating part is formed without applying the masking, strict dimensional management is required when immersing the joint part in the insulating paint. Accordingly, there is still a problem in terms of simplifying workability.

Further, in a case where the insulating part is formed without applying the masking, there is a possibility that the insulating part is formed in the contact region between the thermistor and the electric conductor. Due to this, there is concern about the degradation of the temperature detection accuracy using a thermistor.

Given these problems in the related art, there is room for improvement in terms of ensuring the temperature detection accuracy of the thermistor while ensuring the insulating property of the joint part using a simple configuration.

An aspect of the present invention provides a stator capable of ensuring the temperature detection accuracy of a thermistor while ensuring the insulating property of a joint part using a simple configuration compared to the related art and a rotary electric machine that includes the stator.

(1) A stator according to an aspect of the present invention is a stator which includes a stator core having an annular shape and a plurality of electric conductors that include a coil end which is mounted on a slot of the stator core and which protrudes in an axial direction of the stator core, the stator including: a joint part that is provided on the coil end and that is covered by an insulating part after the electric conductors are joined together; a non-joint part that is a different part of the coil end than the joint part; and a thermistor that detects a heating temperature of the coil end, wherein a recess part that is recessed in the axial direction is provided on an end surface in the axial direction of the stator core, and the thermistor is arranged in the recess part in a state of being in contact with the non-joint part of the coil end in a predetermined electric conductor among the electric conductors.

(2) In the above stator, the stator core may be formed by stacking a plurality of plates, and an arrangement hole that forms the recess part may be formed on and penetrate through plates of a predetermined number that form the end surface side of the stator core among the plurality of plates.

(3) In the above stator, an insulating material may surround the plurality of electric conductors, and a protrusion height of the insulating material that is mounted on the predetermined electric conductor in the recess part may be lower than a protrusion height of the insulating material that is mounted on a different electric conductor than the predetermined electric conductor.

(4) In the above stator, the recess part may be provided at a further outer side in a radial direction of the stator core than the slot in a state of being spaced apart from the slot.

(5) In the above stator, a bracket may be provided on the end surface of the stator core, and the bracket may include a bracket main body that is fixed to the end surface by a bolt, a spring part that is provided to extend toward the non-joint part from the bracket main body and that biases the thermistor to the non-joint part, and a latch part that is provided on the bracket main body and that is latched on an edge portion of the recess part.

(6) A rotary electric machine according to another aspect of the present invention includes the above stator.

According to the above stator described in (1), the recess part is provided on the end surface of the stator core, and the thermistor is arranged in the recess part. Thereby, in the manufacturing of the stator, the contact position between the thermistor and the electric conductor is able to be an inner position (a position that is far from the joint part of the coil end) in the axial direction compared to the related art. Thereby, it is possible to reliably cover the joint part using the insulating part, and it is possible to prevent the insulating part from being formed in the contact region between the thermistor and the electric conductor. Therefore, according to the present configuration, it is possible to provide a rotary electric machine capable of ensuring the temperature detection accuracy of the thermistor while ensuring the insulating property of the joint part using a simple configuration compared to the related art.

According to the above stator described in (2), when the plurality of plates are stacked, and the stator core is formed, the arrangement hole is formed on the surface of the plates of the predetermined number that form the end surface side of the stator core. Therefore, when forming the recess part, it is sufficient to form the arrangement hole on the plates of the predetermined number and stack the plates. Therefore, according to the present configuration, it is possible to easily form the recess part, and therefore, it is possible to ensure the temperature detection accuracy of the thermistor while ensuring the insulating property of the joint part using a simple configuration compared to the related art.

According to the above stator described in (3), the protrusion height of the insulating material that is mounted on the predetermined electric conductor in the recess part is lower than the protrusion height of the insulating material that is mounted on a different electric conductor than the predetermined electric conductor, and therefore, it is possible to reliably expose the contact part between the predetermined electric conductor and the thermistor while ensuring the insulating property between the stator and the electric conductor. Thereby, it is possible to reliably contact the thermistor directly with the electric conductor while covering the electric conductor using the insulating material, and therefore, it is possible to ensure the temperature detection accuracy of the thermistor while ensuring the insulating property of the joint part using a simple configuration compared to the related art.

According to the above stator described in (4), the recess part is provided at the further outer side in the radial direction of the stator core than the slot in a state of being spaced apart from the slot, and therefore, it is possible to provide the recess part without affecting the shape of the teeth of the stator. Therefore, according to the present configuration, it is possible to prevent an impact on the property of the stator, and it is possible to ensure the temperature detection accuracy of the thermistor while ensuring the insulating property of the joint part using a simple configuration compared to the related art.

According to the above stator described in (5), the bracket is provided on the end surface of the stator core, and the bracket includes the bracket main body, the spring part, and the latch part. Thereby, when fixing the bracket main body using the bolt, the latch part is latched on the edge portion of the recess part, and thereby, it is possible prevent the bracket main body from being rotated even when the bolt is rotated. Further, the spring part pushes the non-joint part of the coil end in a state where the latch part is latched on the edge portion of the recess part, and thereby, it is possible to reliably fix the bracket main body against a reaction force of the spring part. Therefore, according to the above stator described in (5), it is possible to easily assemble the thermistor using the bracket, and it is possible to reliably fix the thermistor to the stator core.

According to the above rotary electric machine described in (6), the rotary electric machine includes the stator described above, and therefore, it is possible to ensure the temperature detection accuracy of the thermistor while ensuring the insulating property of the joint part using a simple configuration compared to the related art.

DESCRIPTION OF THE EMBODIMENTS

Hereinafter, embodiments of the present invention will be described with reference to the drawings.

First Embodiment

A stator 3 of a first embodiment will be described.

Figure 1:
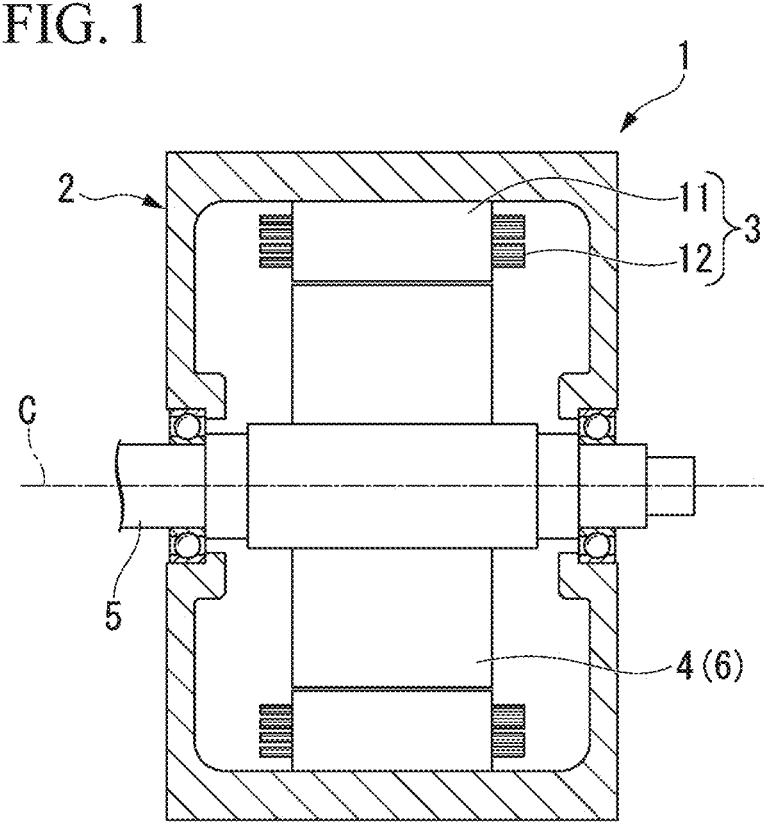
FIG. 1 is a cross-sectional view showing a schematic configuration of a rotary electric machine that includes a stator according to a first embodiment.

FIG. 1 is a cross-sectional view showing a schematic configuration of a rotary electric machine that includes a stator according to the first embodiment.

Figure 2:
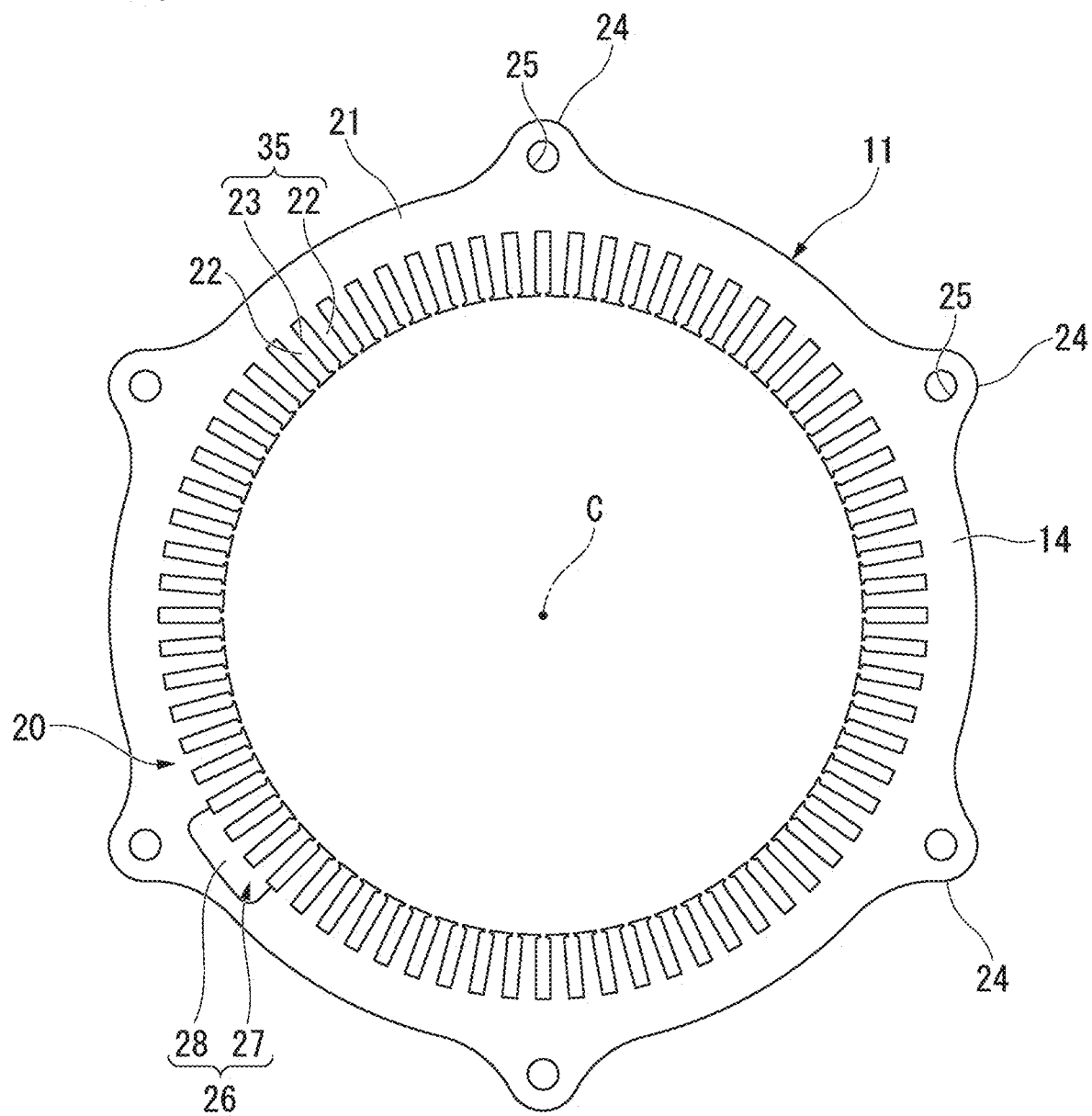
FIG. 2 is a plan view of a stator core according to the first embodiment.

FIG. 2 is a plan view of the stator core.

A rotary electric machine 1 of the present embodiment is, for example, a travel motor that is mounted on a vehicle such as a hybrid automobile or an electric automobile. However, the configuration of the present embodiment is applicable to not only the above example but also a motor of other applications such as an electric power generation motor that is mounted on a vehicle. Further, the configuration of the present embodiment is applicable to all kinds of so-called rotary electric machines that include an electric power generator as well as the rotary electric machine that is mounted on the vehicle.

As shown in FIG. 1, the rotary electric machine 1 according to the first embodiment includes a case 2, a stator 3, a rotor 4, and an output shaft 5.

The output shaft 5 is supported rotatably by the case 2.

The rotor 4 includes a rotor core 6 and a magnet (not shown) that is attached to the rotor core 6. The rotor core 6 is formed in a tubular shape that is externally fitted to the output shaft 5. In the following description, a direction along an axis line C of the output shaft 5 may be referred to as an axial direction, a direction orthogonal to the axis line C may be referred to as a radial direction, and a direction around the axis line C may be referred to as a circumferential direction.

The stator 3 includes a stator core 11 and a coil 12 that is mounted on the stator core 11.

As shown in FIG. 2, the stator core 11 is formed in a tubular shape that surrounds the rotor 4 (refer to FIG. 1) from an outer side in the radial direction. The stator core 11 is formed by stacking, in the axial direction, a plurality of plates 14 having an annular shape and formed by applying a punching process or the like on an electromagnetic steel plate.

The stator core 11 includes a back yoke part 21 and teeth 22.

The back yoke part 21 is formed in a tubular shape that is arranged coaxially with the axis line C. An attachment part 24 that protrudes outward in the radial direction is formed on an outer circumferential surface of the back yoke part 21. The stator core 11 is fixed to the case 2 via the attachment part 24. In the example of FIG. 2, a plurality of attachment parts 24 are formed so as to be spaced in the circumferential direction. An attachment hole 25 that penetrates through the attachment part 24 in the axial direction is formed on the attachment part 24. A bolt (not shown) for fastening the stator core 11 to the case 2 is inserted through the attachment hole 25. The number of, the position, and the like of the attachment parts 24 can be appropriately changed.

The teeth 22 protrude inward in the radial direction from an inner circumferential surface of the back yoke part 21.

A plurality of teeth 22 are formed so as to be spaced in the circumferential direction. A slot 23 through which the coil 12 is inserted is formed between the teeth 22 that are adjacent to each other in the circumferential direction. That is, the slot 23 is formed by an inner circumferential surface of the back yoke part 21 and surfaces that face each other in the circumferential direction of the adjacent teeth 22. The slot 23 penetrates through the stator core 11 in the axial direction. The slot 23 of the present embodiment is a so-called open slot of which the inner side in the radial direction is open. However, the slot 23 may be a so-called closed slot of which the inner side in the radial direction is closed.

A recess part 26 is provided on an end surface 20 of the stator core 11. The recess part 26 is formed in the vicinity of the attachment hole 25. The recess part 26 is formed toward a middle part from an inner circumferential end of the end surface 20. Specifically, the recess part 26 is provided in an arrangement region 35 and on an outer circumferential side of the arrangement region 35. Here, the arrangement region 35 is the teeth 22 and the slot 23 and is a region in which a second connection part 42 (refer to FIG. 5) of a plurality of segment electric conductors 31 described later is arranged. An outer circumferential side of the arrangement region 35 is the back yoke part 21. The recess part 26 is formed in a substantially rectangular shape in plan view. A thermistor 7 (refer to FIG. 5) described later is arranged on the recess part 26.

The recess part 26 is formed of an arrangement hole 27 and a surface 28 of the plate 14 that is arranged to be overlapped with the plate 14 having the arrangement hole 27. The arrangement hole 27 is formed in a substantially rectangular shape in plan view. The arrangement hole 27 is formed to penetrate through the surfaces 28 of plates 14 of a predetermined number that form the end surface 20 side of the stator core 11 among the plurality of plates 14. The arrangement hole 27 is formed to be notched toward a middle part from an inner circumferential end of the end surface 20 of the plates 14 of the predetermined number. Specifically, the arrangement hole 27 is formed in the arrangement region 35 and on an outer circumferential side of the arrangement region 35.

Figure 3:
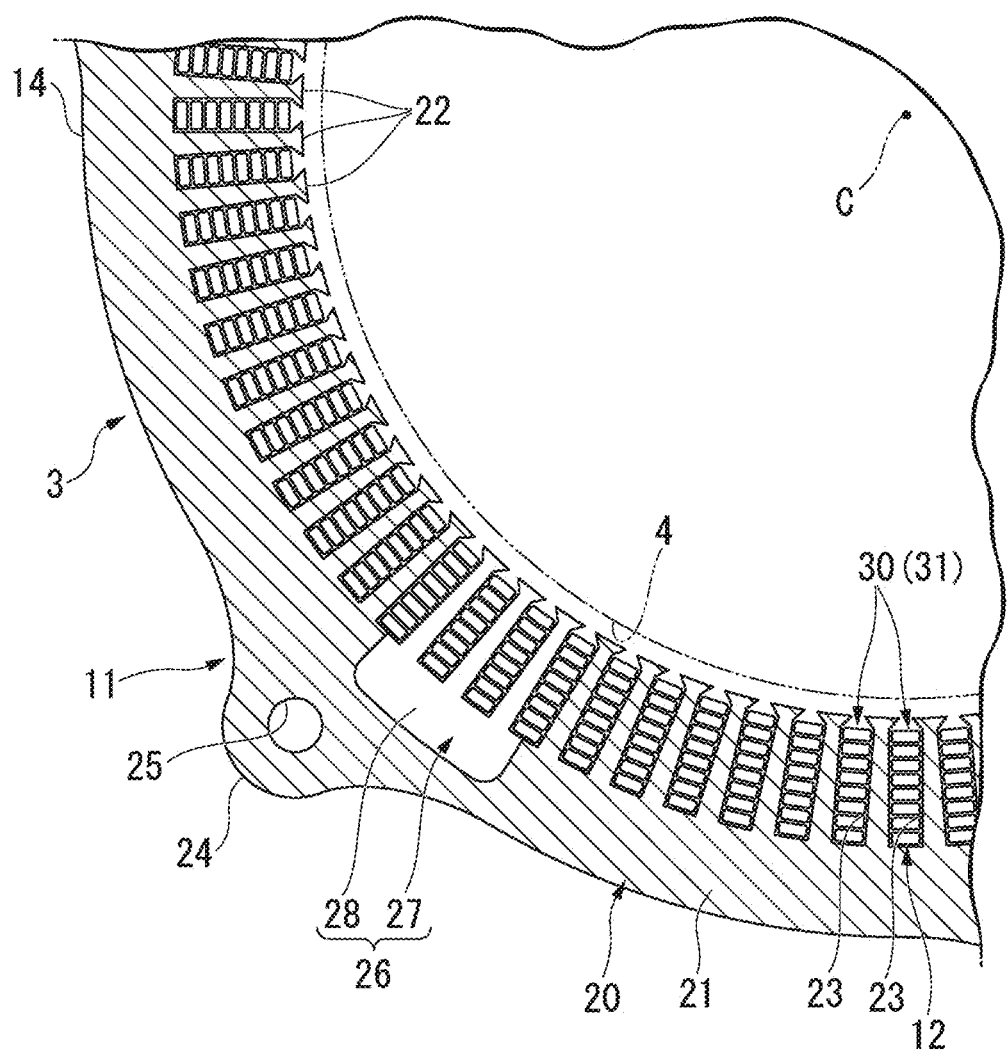
FIG. 3 is a partial cross-sectional view that includes an arrangement hole of a stator according to the first embodiment.

FIG. 3 is a partial cross-sectional view that includes an arrangement hole of a stator.

As shown in FIG. 3, the coil 12 is attached to the stator core 11 in a state where part of the coil 12 is accommodated in the slot 23 of the stator core 11. The coil 12 has three phases, which are a U-phase, a V-phase, and a W-phase. The coil 12 of each phase is formed by the plurality of segment coils 30 being connected together.

Figure 4:
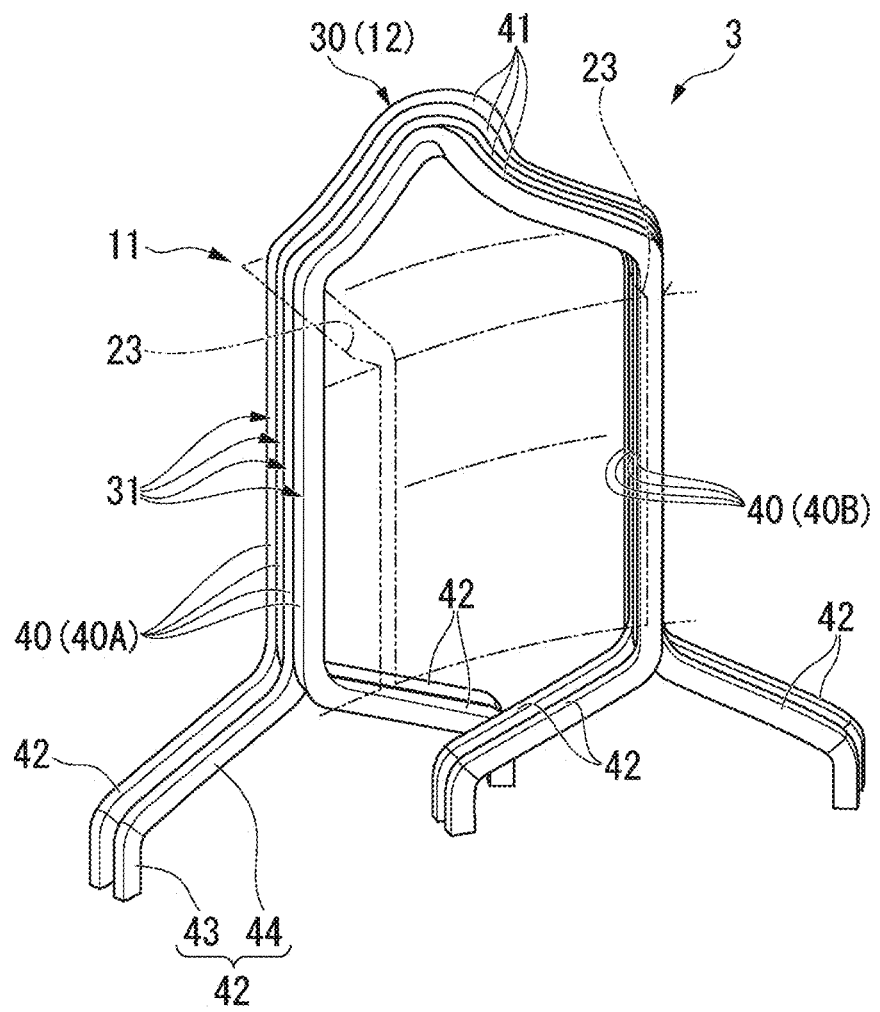
FIG. 4 is a perspective view showing one segment coil according to the first embodiment.

FIG. 4 is a perspective view showing one segment coil 30.

As shown in FIG. 4, the segment coil 30 is formed by a plurality of (for example, four) segment electric conductors 31 (electric conductors) being overlapped with one another in the radial direction. Each of the segment electric conductors 31 is formed by a core wire being covered by an insulating cover. Each of the segment electric conductors 31 is, for example, a rectangular wire. A cross-sectional shape that is orthogonal to an extension direction of each of the segment electric conductors 31 is a rectangular shape.

Each of the segment electric conductors 31 includes two straight line parts 40 (40A, 40B), a first connection part 41, and two second connection parts 42.

The straight line parts 40A, 40B extend in parallel with each other in the axial direction. Each of the straight line parts 40A, 40B is accommodated in a different slot 23, for example, in a state of being covered by an insulating paper 8 (refer to FIG. 5).

The first connection part 41 connects end portions in the axial direction of the two straight line parts 40A, 40B at the outside of the slot 23. As shown in FIG. 1, the first connection part 41 protrudes from the end surface 20 of the stator core 11.

Each of the second connection parts 42 continues to each of end portions in the axial direction of the straight line parts 40A, 40B and is drawn to the outside of the slot 23. A core wire is exposed at an end portion (a joint part 43 described later) of the second connection part 42. One of the pair of the second connection parts 42 is connected to a second connection part 42 of another segment coil 30, for example, by TIG welding, laser welding, or the like. Another of the second connection parts 42 is joined to a second connection part 42 of another different segment coil 30. Thereby, the plurality of segment coils 30 are sequentially connected. The second connection part 42 protrudes from the end surface 20 of the stator core 11 as shown in FIG. 1. The second connection part 42 corresponds to a coil end.

The second connection part 42 includes the joint part 43 and a non-joint part 44. The joint part 43 is formed on a front end side of the second connection part 42. The joint parts 43 of the second connection parts 42 are joined.

The non-joint part 44 is a different part of the second connection part 42 than the joint part 43 of the second connection part 42.

As shown in FIG. 4, the plurality of segment electric conductors 31 that are inserted in the same slot 23 are arranged in a line along the radial direction of the stator core 11. That is, the straight line parts 40A, 40B of the segment electric conductor 31 are arranged in the same slot 23 such that a short-side direction is matched with the radial direction, and a long-side direction is crossed with the radial direction. A current of the same phase among the three phases of the U-phase, the V-phase, and the W-phase flows through the plurality of segment electric conductors 31 that constitute one segment coil 30.

The segment coil 30 is inserted in the slot 23 from the outside of the stator core 11 along the axial direction of the stator core 11. Specifically, the segment coil 30 is inserted in the slot 23 in a state where the second connection part 42 extends straight with respect to the straight line parts 40A, 40B.

In the segment coil 30, after the straight line parts 40A, 40B are inserted in the slot 23, each of the second connection parts 42 is bent in the circumferential direction such that the bending direction is an opposite direction between the segment electric conductors 31 that are adjacent in the radial direction. Thereby, the segment coils 30 that are adjacent in the circumferential direction are connected together via the second connection part 42.

Figure 5:
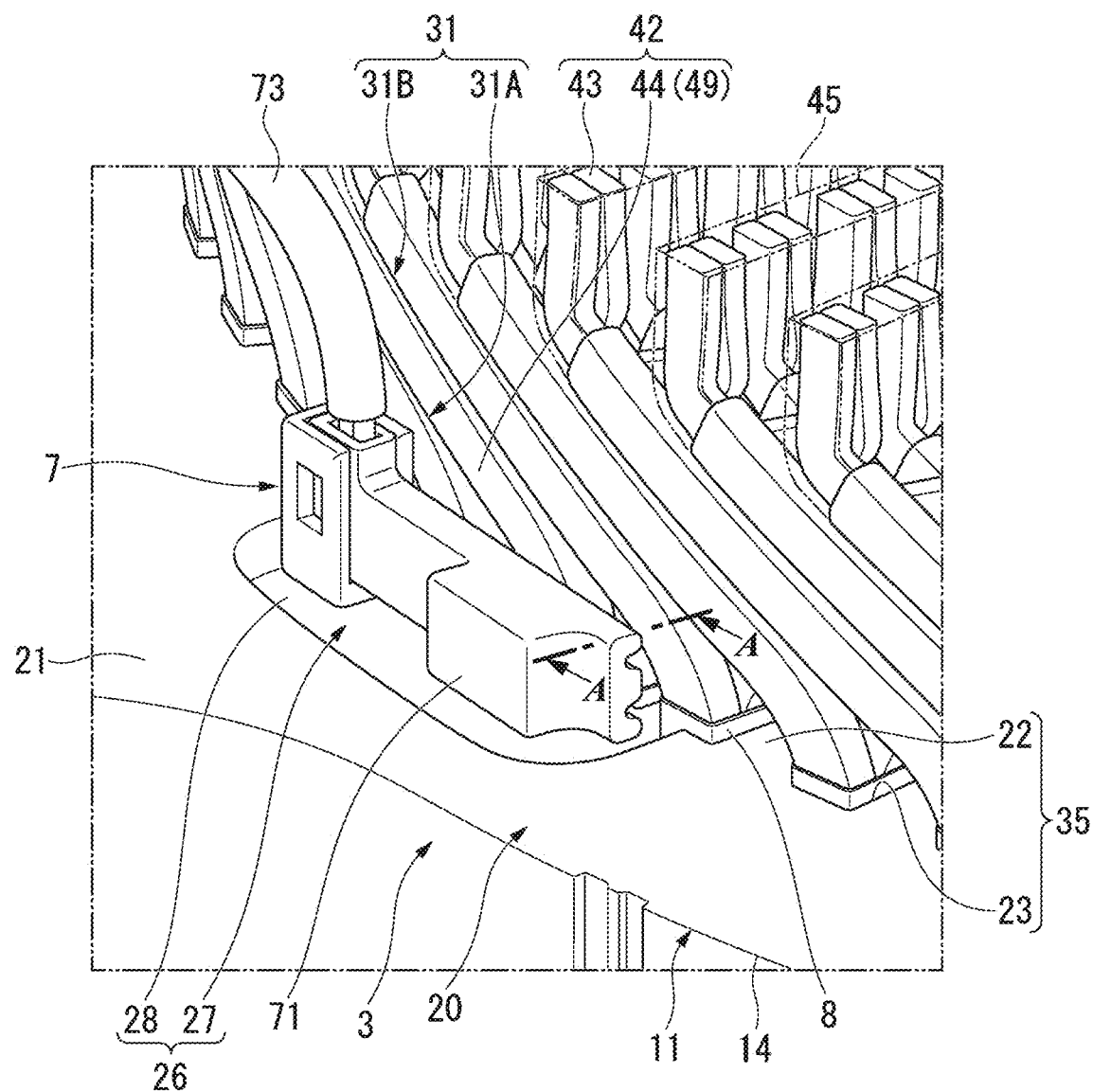
FIG. 5 is a perspective view of a main part of the stator according to the first embodiment.

FIG. 5 is a perspective view of a main part of the stator.

As shown in FIG. 5, a powder 45 (corresponds to an "insulating part") having the insulating property covers the joint part 43 of each of the second connection parts 42 by painting. In FIG. 5, the powder 45 is shown by a two-dot chain line.

For example, a method of immersing the joint part 43 in the powder 45 in a container is employed as a paint method of the powder 45.

The thermistor 7 is attached to the stator 3. The thermistor 7 is arranged in the recess part 26. The thermistor 7 is arranged in contact with an outside surface 49 of the non-joint part 44 in a predetermined segment electric conductor 31A (predetermined electric conductor) that is on the outer circumferential side among the plurality of segment electric conductors 31 (electric conductors). The thermistor 7 detects a heating temperature of the second connection part 42. Specifically, the thermistor 7 detects the heating temperature of the second connection part 42 using a change of a resistance value accompanied by the temperature change.

Figure 6:
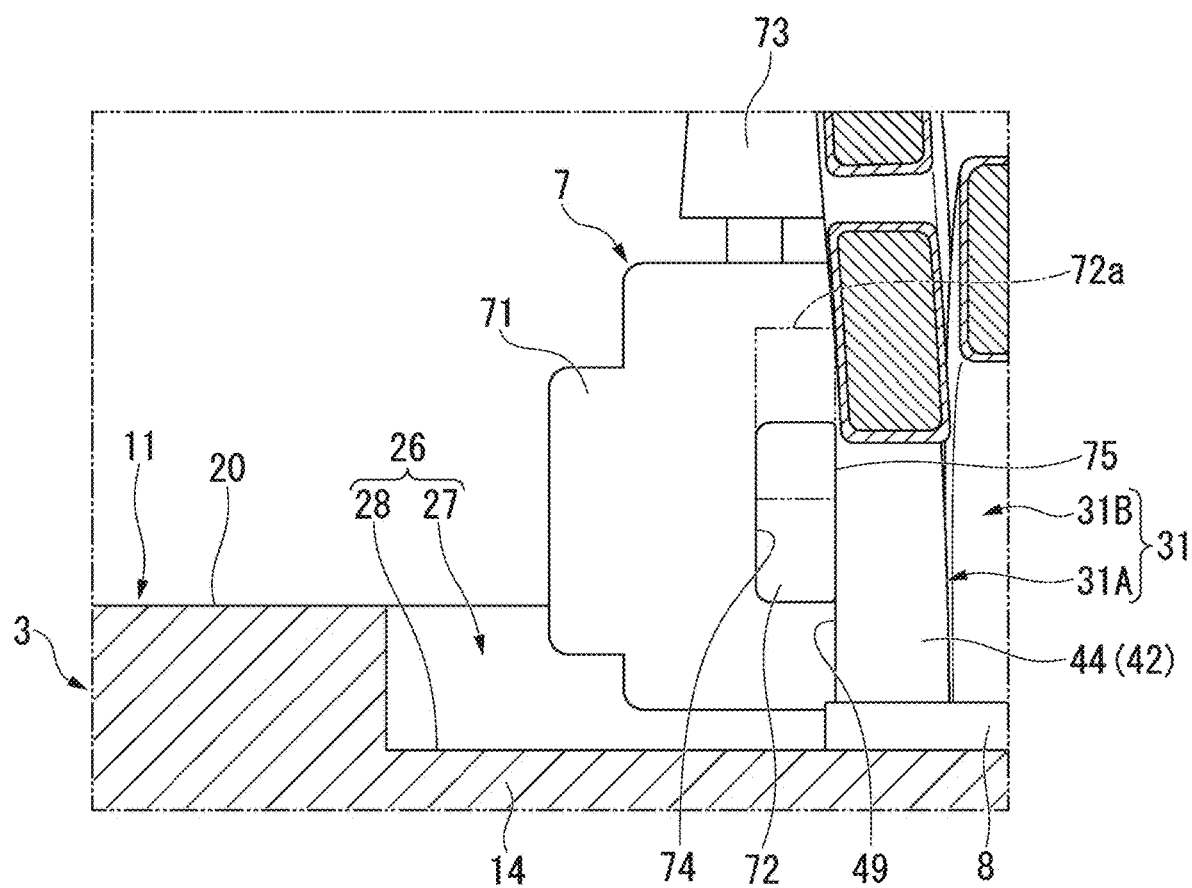
FIG. 6 is an A-A cross-sectional view of FIG. 5.

FIG. 6 is an A-A cross-sectional view of FIG. 5. In FIG. 6, a contact position of a detection part 72a of the thermistor 7 of the related art is indicated by a two-dot chain line.

As shown in FIG. 6, the thermistor 7 includes a holder 71, a detection part 72, and an output line 73.

The holder 71 is arranged in the recess part 26. An accommodation part 74 is formed on the holder 71 on a surface at the non-joint part 44 side of the second connection part 42. The accommodation part 74 is formed in a recess shape.

The detection part 72 is accommodated in the accommodation part 74.

A side surface 75 of the detection part 72 is exposed from the holder 71. The side surface 75 of the detection part 72 is in contact with the outside surface 49 of the non-joint part 44 of the second connection part 42. The detection part 72 detects the heating temperature of the non-joint part 44 and outputs a detection signal.

One end of the output line 73 is electrically connected to the detection part 72. The output line 73 externally outputs the detection signal from the detection part 72. Another end of the output line 73 is electrically connected to, for example, a control part such as an ECU. The control part acquires and monitors the heating temperature of the non-joint part 44 on the basis of the detection signal that is output from the output line 73.

Figure 7:
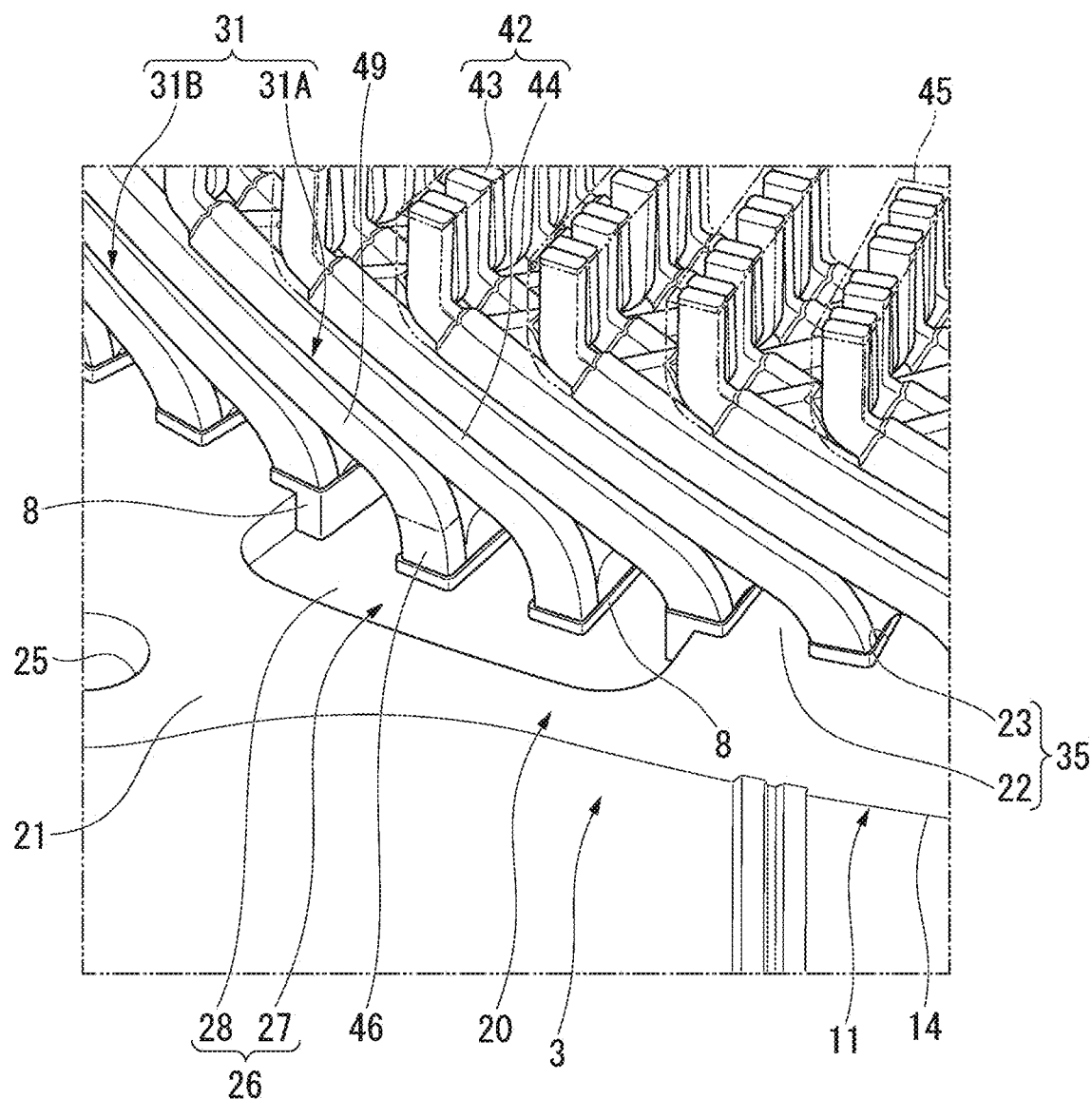
FIG. 7 is a perspective view showing a state in which a thermistor is detached from the stator shown in FIG. 5.

FIG. 7 is a perspective view showing a state in which a thermistor is detached from the stator shown in FIG. 5.

Figure 8:
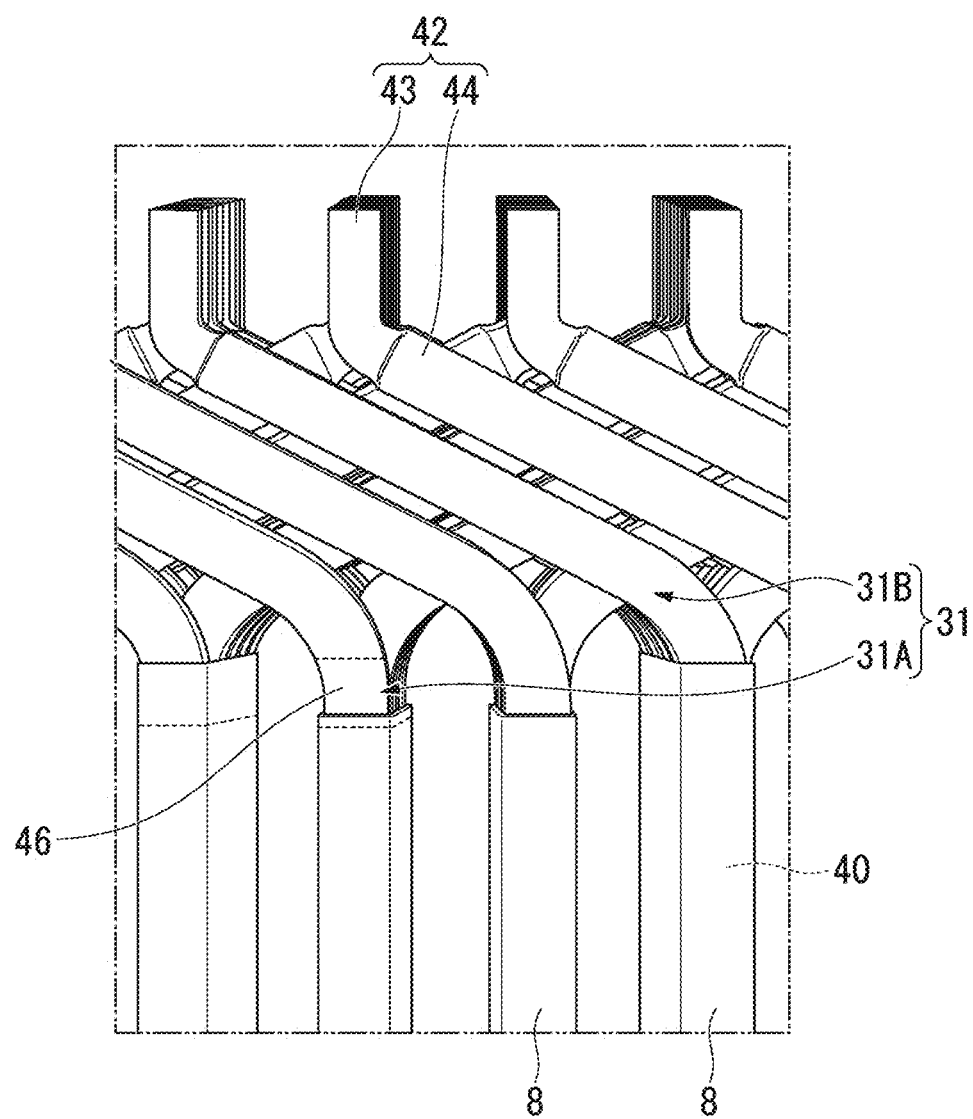
FIG. 8 is a view showing a part on a second connection part side of a plurality of segment electric conductors according to the first embodiment.

FIG. 8 is a view showing a part on a second connection part side of a plurality of segment electric conductors. In FIG. 8, the stator core 11 and the powder 45 are omitted and are not shown.

As shown in FIG. 7 and FIG. 8, the non-joint part 44 of the second connection part 42 of the plurality of segment electric conductors 31 is covered by an insulating paper 8 (corresponds to an "insulating material"). The insulating paper 8 covers the segment electric conductor 31 from a base end side of the non-joint part 44 throughout the entire straight line part 40 in the slot 23.

The protrusion height of the insulating paper 8 that is mounted on the predetermined segment electric conductor 31A in the recess part 26 is lower than the protrusion height of the insulating paper 8 that is mounted on a different segment electric conductor 31B than the predetermined segment electric conductor 31A. Thereby, a contact part 46 that is not covered by the insulating paper 8 is formed on the second connection part 42 of the predetermined segment electric conductor 31A.

Next, a manufacturing method of the stator core 11 will be described.

The stator core 11 is manufactured by, for example, a sequential sending method. First, an electromagnetic steel plate that has a band shape and that is transported on a line is punched a plurality of times using a metallic mold to form a rotor. Thereby, a plate of a rotor core is formed.

Subsequently, the remaining electromagnetic steel plate is punched a plurality of times using a metallic mold to form the stator core 11. Thereby, a predetermined number of plates 14 of the stator core 11 having an annular shape are formed.

Subsequently, the plate 14 of the stator core 11 is punched a plurality of times using a metallic mold to form the stator core 11 and is punched using a metallic mold to form the arrangement hole 27. Thereby, a predetermined number of plates 14 having the arrangement hole 27 are formed.

The punched plate 14 of the stator core 11 is sequentially stacked while being rotated by a predetermined angle (so-called rotation stacking).

The formed plates 14 are then swaged. Thereby, the stator core 11 that includes the recess part 26 is formed.

The predetermined number of the plates 14 that form the recess part 26 is a number that does not greatly affect the performance of the stator 3 (rotary electric machine 1). The predetermined number is, for example, about ten. Further, the predetermined number of the plates 14 is set such that a separation distance between the powder 45 and the thermistor 7 is sufficiently (for example, about 10 mm from the powder 45) ensured.

According to the stator 3 of the present embodiment, the recess part 26 is provided on the end surface 20 of the stator core 11, and the thermistor 7 is arranged in the recess part 26. Thereby, in the manufacturing of the stator 3, the contact position between the thermistor 7 and the segment electric conductor 31 is able to be at a further inner position (a position that is far from the joint part 43 of the second connection part 42) in the axial direction than a conventional position (a conventional contact position of the detection part 72a indicated by a two-dot chain line in FIG. 6). Thereby, it is possible to reliably cover the joint part 43 using the powder 45, and it is possible to prevent the powder 45 from being formed in the contact region between the thermistor 7 and the segment electric conductor 31. Therefore, according to the present embodiment, it is possible to provide the rotary electric machine 1 capable of ensuring temperature detection accuracy of the thermistor 7 while ensuring the insulating property of the joint part 43 using a simple configuration compared to the related art.

Further, according to the stator 3 of the present embodiment, when the plurality of plates 14 are stacked, and the stator core 11 is formed, the arrangement hole 27 is formed on the surface 28 of the plates 14 of the predetermined number that form the end surface 20 side of the stator core 11. Therefore, when forming the recess part 26, it is sufficient to form the arrangement hole 27 on the plates 14 of the predetermined number and stack the plates 14. Therefore, according to the present embodiment, it is possible to easily form the recess part 26, and therefore, it is possible to ensure the temperature detection accuracy of the thermistor 7 while ensuring the insulating property of the joint part 43 using a simple configuration compared to the related art.

Further, according to the stator 3 of the present embodiment, the protrusion height of the insulating paper 8 that is mounted on the predetermined segment electric conductor 31A in the recess part 26 is lower than the protrusion height of the insulating paper 8 that is mounted on a different segment electric conductor 31B than the predetermined segment electric conductor 31A, and therefore, it is possible to reliably expose the contact part 46 between the predetermined segment electric conductor 31A and the thermistor 7 while ensuring the insulating property between the stator 3 and the segment electric conductor 31. Thereby, it is possible to reliably contact the thermistor 7 directly with the segment electric conductor 31 while covering the segment electric conductor 31 using the insulating paper 8, and therefore, it is possible to ensure the temperature detection accuracy of the thermistor 7 while ensuring the insulating property of the joint part 43 using a simple configuration compared to the related art.

Further, according to the rotary electric machine 1 of the present embodiment, the rotary electric machine 1 includes the stator 3 described above, and thereby, it is possible to ensure the temperature detection accuracy of the thermistor 7 while ensuring the insulating property of the joint part 43 using a simple configuration compared to the related art.

Second Embodiment

Next, with reference to FIG. 9, a stator of a second embodiment of the present invention will be described.

Figure 9:
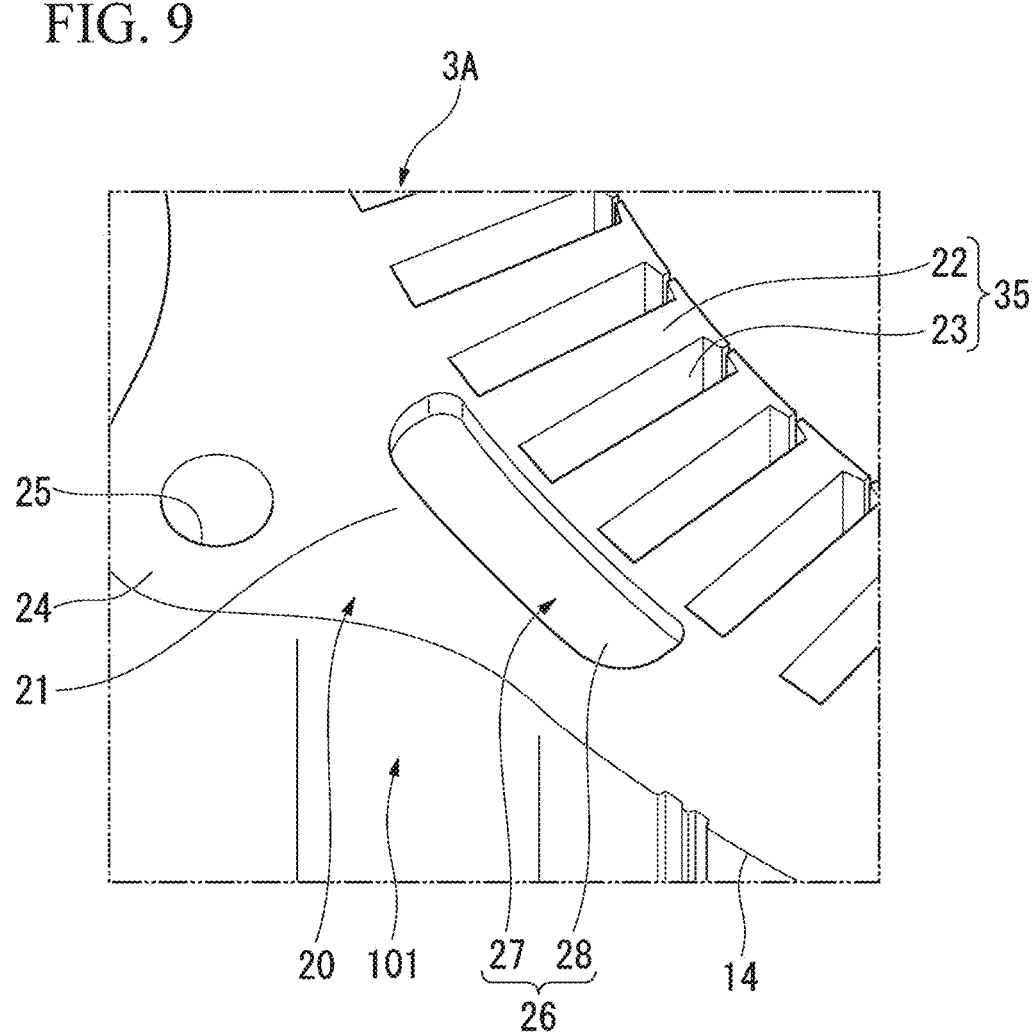
FIG. 9 is a perspective view showing a main part of a stator core according to a second embodiment of the present invention.

FIG. 9 is a perspective view showing a main part of a stator core of a stator according to the second embodiment.

As shown in FIG. 9, the recess part 26 is provided on the end surface 20 of a stator core 101.

The recess part 26 is formed in a substantially rectangular shape that extends in the circumferential direction. The recess part 26 is provided adjacent to and on an outer circumferential side of the arrangement region 35 in the end surface 20. Specifically, the recess part 26 is provided on the back yoke part 21 of the end surface 20. The recess part 26 is provided at a further outer side in the radial direction of the stator core 101 than the slot 23 in a state of being spaced apart from the slot 23.

According to a stator 3A of the present embodiment, the recess part 26 is provided at a further outer side in the radial direction of the stator core 101 than the slot 23 in a state of being spaced apart from the slot 23, and therefore, it is possible to provide the recess part 26 without affecting the shape of the teeth 22 of the stator 3A.

Therefore, according to the present embodiment, it is possible to prevent an impact on the property of the stator 3A, and it is possible to ensure the temperature detection accuracy of the thermistor 7 while ensuring the insulating property of the joint part 43 using a simple configuration compared to the related art.

Third Embodiment

Next, with reference to FIG. 10, a stator 3B of a third embodiment of the present invention will be described.

Figure 10:
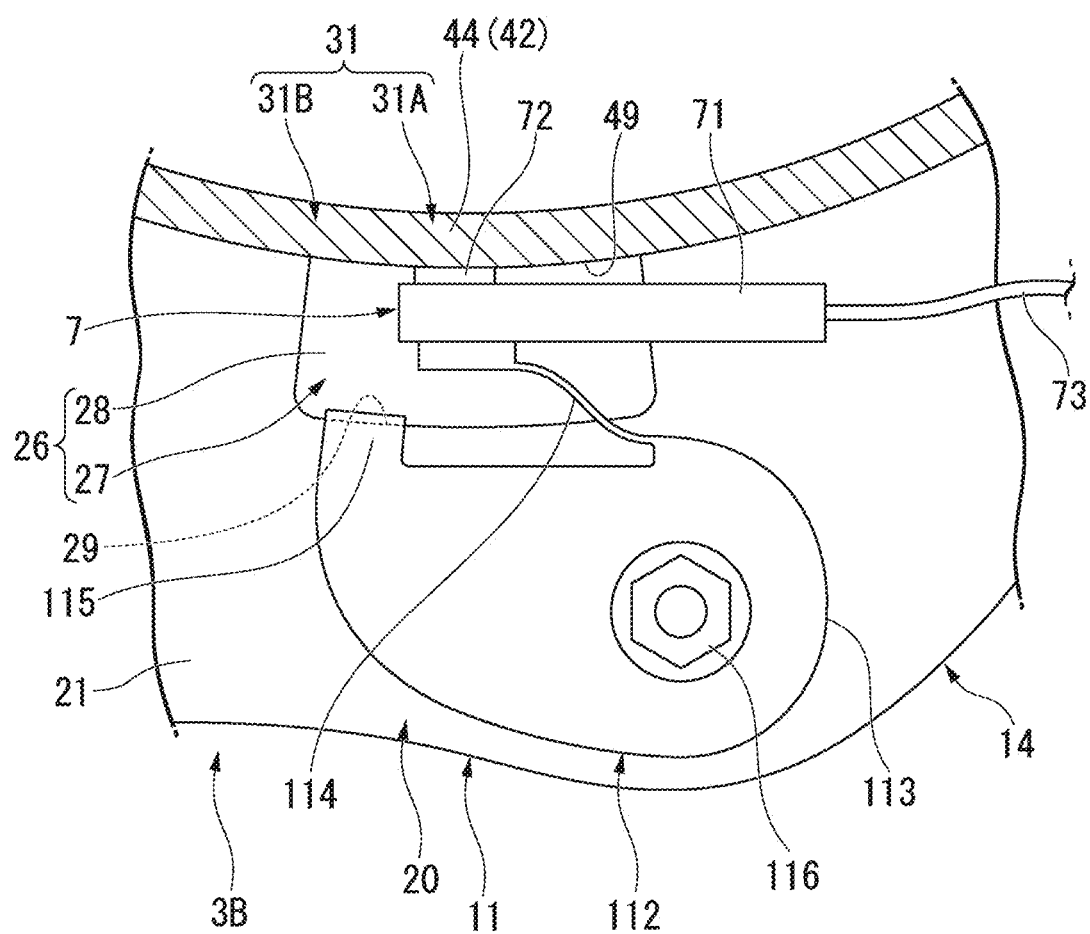
FIG. 10 is a plan view of a main part of a stator according to a third embodiment of the present invention.

FIG. 10 is a plan view of a main part of a stator according to the third embodiment. In FIG. 10, the segment electric conductor 31 is schematically shown.

As shown in FIG. 10, a bracket 112 is provided on the end surface 20 of the stator core 11 in the stator 3B. Specifically, the bracket 112 is provided on the end surface 20 at a further outer circumferential side (the back yoke part 21) than the recess part 26. The bracket 112 includes a bracket main body 113, a spring part 114, and a latch part 115.

The bracket main body 113 is fixed, for example, by a bolt 116 that is inserted in the attachment hole 25 (refer to FIG. 2) of the stator core 11. The spring part 114 extends toward the non-joint part 44 of the second connection part 42 in the predetermined segment electric conductor 31A from the bracket main body 113. The spring part 114 presses the thermistor 7 to the non-joint part 44 by an elastic force. The latch part 115 is provided on the bracket main body 113. The latch part 115 is latched on an edge portion 29 of the recess part 26.

According to the present embodiment, when fixing the bracket main body 113 using the bolt 116, the latch part 115 is latched on the edge portion 29 of the recess part 26, and thereby, it is possible prevent the bracket main body 113 from being rotated even when the bolt 116 is rotated. Further, the spring part 114 pushes the non-joint part 44 of the second connection part 42 in a state where the latch part 115 is latched on the edge portion 29 of the recess part 26, and thereby, it is possible to reliably fix the bracket main body 113 against a reaction force of the spring part 114. Therefore, according to the stator 3B of the present embodiment, it is possible to easily assemble the thermistor 7 using the bracket 112, and it is possible to reliably fix the thermistor 7 to the stator core 11.

The technical scope of the present invention is not limited to the embodiments described above, and various changes can be made without departing from the scope of the invention.

In the embodiments, the present invention is applied to a case where the thermistor 7 is provided on the second connection part 42 that is a connection part on an open side of the segment electric conductor 31; however, the present invention may be applied to a case where the thermistor 7 is provided on the first connection part 41 that is a connection part on an closed side (a side that is not welded) of the segment electric conductor 31.

A configuration element in the embodiments described above can be appropriately replaced by a known configuration element without departing from the scope of the invention. Further, the embodiments and modified examples described above may be appropriately combined.

What is claimed is:

1. A stator which includes a stator core having an annular shape and a plurality of electric conductors that include a coil end which is mounted on a slot of the stator core and which protrudes in an axial direction of the stator core, the stator comprising:
    a joint part that is provided on the coil end and that is covered by an insulating part after the electric conductors are joined together;
    a non-joint part that is a different part of the coil end than the joint part; and
    a thermistor that detects a heating temperature of the coil end,
    wherein a recess part that is recessed in the axial direction is provided on an end surface in the axial direction of the stator core, and
    the thermistor is arranged in the recess part in a state of being in contact with the non-joint part of the coil end in a predetermined electric conductor among the electric conductors.

2. The stator according to claim 1,
    wherein the stator core is formed by stacking a plurality of plates, and an arrangement hole that forms the recess part is formed on and penetrates through plates of a predetermined number that form the end surface side of the stator core among the plurality of plates.

3. The stator according to claim 1,
wherein an insulating material surrounds the plurality of electric conductors, and
a protrusion height of the insulating material that is mounted on the predetermined electric conductor in the recess part is lower than a protrusion height of the insulating material that is mounted on a different electric conductor than the predetermined electric conductor.

4. The stator according to claim 1,
wherein the recess part is provided at a further outer side in a radial direction of the stator core than the slot in a state of being spaced apart from the slot.

5. The stator according to claim 1,
wherein a bracket is provided on the end surface of the stator core, and
the bracket comprises
 a bracket main body that is fixed to the end surface by a bolt,
 a spring part that is provided to extend toward the non-joint part from the bracket main body and that biases the thermistor to the non-joint part, and
 a latch part that is provided on the bracket main body and that is latched on an edge portion of the recess part.

6. A rotary electric machine, comprising
a stator according to claim 1.

* * * * *